United States Patent
Sanders et al.

(10) Patent No.: US 11,807,149 B2
(45) Date of Patent: Nov. 7, 2023

(54) DEPLOYMENT OF POWER FLOW CONTROL SYSTEMS

(71) Applicant: Smart Wires Inc., Union City, CA (US)

(72) Inventors: Mark Sanders, Kalispell, MT (US); Bryce Puchta, Kalispell, MT (US); Brock Petersen, Oakland, CA (US); Amrit Iyer, Oakland, CA (US); Ali Farahani, Yorba Linda, CA (US); John Parks, Kennesaw, GA (US)

(73) Assignee: Smart Wires Inc., Durham, NC (US)

( * ) Notice: Subject to any disclaimer, the term of this patent is extended or adjusted under 35 U.S.C. 154(b) by 703 days.

(21) Appl. No.: 16/785,231

(22) Filed: Feb. 7, 2020

(65) Prior Publication Data

US 2021/0066917 A1   Mar. 4, 2021

Related U.S. Application Data

(60) Provisional application No. 62/894,599, filed on Aug. 30, 2019.

(51) Int. Cl.
*B60P 3/00* (2006.01)
*B66C 1/66* (2006.01)
*H02J 3/18* (2006.01)
*H01T 19/02* (2006.01)

(52) U.S. Cl.
CPC ............... *B60P 3/00* (2013.01); *H01T 19/02* (2013.01); *H02J 3/18* (2013.01); *B66C 1/66* (2013.01)

(58) Field of Classification Search
None
See application file for complete search history.

(56) References Cited

U.S. PATENT DOCUMENTS

| | | | |
|---|---|---|---|
| 2,173,277 A * | 9/1939 | Jarmin | B60P 1/6454 |
| | | | 280/763.1 |
| 3,073,466 A * | 1/1963 | Greer | B60P 7/13 |
| | | | 280/DIG. 8 |
| 4,117,342 A * | 9/1978 | Melley, Jr. | B60P 3/00 |
| | | | 290/1 A |
| 4,136,432 A * | 1/1979 | Melley, Jr. | B60P 3/00 |
| | | | 29/469 |
| 4,991,672 A | 2/1991 | Leino | |
| 5,067,741 A | 11/1991 | Ayme | |
| 5,142,278 A | 8/1992 | Moallemi et al. | |

(Continued)

FOREIGN PATENT DOCUMENTS

| | | | | |
|---|---|---|---|---|
| AU | 2012269721 A1 * | 12/2013 | ............ | B60P 3/035 |
| AU | 2013289865 A1 * | 2/2015 | ............ | B60P 7/12 |

(Continued)

*Primary Examiner* — Kevin R Steckbauer
(74) *Attorney, Agent, or Firm* — Womble Bond Dickinson (US) LLP

(57) ABSTRACT

A trailer-based system and related method are described for efficiently transporting, configuring and deploying a power flow control system, including connection to a power transmission line. The system may include preconfigured modules using bolted attachments, hoist rings and a corona ring structure. Standardized clamps are also used. A plurality of power flow control modules is operable while mounted on the trailer. The power flow control modules are configurable to inject reactive power into the power transmission line.

12 Claims, 9 Drawing Sheets

(56) References Cited

U.S. PATENT DOCUMENTS

| | | | |
|---|---|---|---|
| 5,193,838 A | 3/1993 | Olson | |
| 5,411,359 A | 5/1995 | Kossila | |
| 5,624,225 A * | 4/1997 | Cox | B60P 1/6427 |
| | | | 414/498 |
| 5,634,605 A * | 6/1997 | Rubel | B60P 3/20 |
| | | | 248/228.1 |
| 6,209,939 B1 | 4/2001 | Wacker | |
| 6,779,616 B1 | 8/2004 | Brown | |
| 7,035,285 B2 | 4/2006 | Holloway et al. | |
| 7,275,907 B1 | 10/2007 | Reichard | |
| 7,338,409 B2 | 3/2008 | Ronge et al. | |
| 7,497,458 B2 | 3/2009 | Daniel | |
| 7,621,356 B2 | 11/2009 | Quarberg | |
| 7,654,780 B1 * | 2/2010 | Stevens | B60P 7/15 |
| | | | 410/151 |
| 8,109,394 B1 * | 2/2012 | Blincoe | A47B 81/007 |
| | | | 211/41.15 |
| 8,622,425 B2 | 1/2014 | Riedl | |
| 9,481,512 B2 * | 11/2016 | Diniaco | B60P 1/6418 |
| 9,616,756 B2 | 4/2017 | Fritz et al. | |
| 9,859,835 B2 | 1/2018 | Click | |
| 2001/0003393 A1 * | 6/2001 | Cooper | B62D 59/04 |
| | | | 280/411.1 |
| 2002/0012343 A1 | 1/2002 | Holloway et al. | |
| 2004/0256184 A1 | 12/2004 | Liljeberg et al. | |
| 2005/0023050 A1 | 2/2005 | Chidlow et al. | |
| 2006/0183595 A1 | 8/2006 | Ronge et al. | |
| 2007/0222183 A1 | 9/2007 | Daniel | |
| 2008/0116434 A1 | 5/2008 | Quarberg | |
| 2010/0096197 A1 | 4/2010 | Stoddart | |
| 2011/0115205 A1 | 5/2011 | Riedl | |
| 2012/0321436 A1 * | 12/2012 | Diniaco | B65D 90/0073 |
| | | | 340/8.1 |
| 2015/0102147 A1 * | 4/2015 | Anderson | B02C 21/02 |
| | | | 241/101.741 |
| 2016/0141934 A1 | 5/2016 | Click | |
| 2016/0318402 A1 | 11/2016 | Fritz et al. | |
| 2017/0015497 A1 * | 1/2017 | Diniaco | B60P 7/0815 |
| 2017/0276619 A1 * | 9/2017 | Tang | G01N 23/044 |
| 2019/0134440 A1 * | 5/2019 | Carter | F04B 17/06 |
| 2021/0066917 A1 * | 3/2021 | Sanders | H02J 3/18 |

FOREIGN PATENT DOCUMENTS

| | | | | |
|---|---|---|---|---|
| AU | 2014310492 A1 * | 3/2016 | | B60D 1/242 |
| BE | 1014698 A6 * | 3/2004 | | B60P 1/283 |
| CA | 3040109 A1 * | 4/2018 | | B60P 1/025 |
| CN | 104670349 A * | 6/2015 | | B60P 1/02 |
| CN | 105438288 A * | 3/2016 | | B60P 7/08 |
| CN | 105722725 A * | 6/2016 | | B60P 3/40 |
| CN | 105722725 B * | 9/2017 | | B60P 3/40 |
| CN | 104670349 B * | 12/2017 | | B60P 1/02 |
| CN | 105438288 B * | 3/2018 | | B60P 7/08 |
| CN | 112339860 A * | 2/2021 | | B60P 7/135 |
| CN | 112339860 B * | 9/2021 | | B60P 7/135 |
| CN | 115320474 A * | 11/2022 | | |
| CN | 217730518 U * | 11/2022 | | |
| CN | 217847642 U * | 11/2022 | | |
| DE | 202015007978 U1 * | 8/2016 | | |
| EP | 3088731 A1 * | 11/2016 | | F03D 13/40 |
| GB | 1563035 A * | 3/1980 | | B60P 3/00 |
| NO | 327954 B1 * | 10/2009 | | B60P 1/6445 |
| WO | WO-2019177681 A1 * | 9/2019 | | |
| WO | WO-2022047781 A1 * | 3/2022 | | |

* cited by examiner

DEPLOYMENT OF POWER FLOW CONTROL SYSTEMS

This application claims benefit of priority from U.S. Provisional Application No. 62/894,599 filed Aug. 30, 2019, which is hereby incorporated by reference.

BACKGROUND

Power flow control systems require a complex collection of modules and components to be delivered, configured and tested at an installation site.

To reduce installation time and make the installment process more efficient in a trailer-based deployment, there is a need in the art for efficient configurations, optimized for their transportation, deployment, and power line implementations.

SUMMARY

A platform for transport, installation, testing and deployment of power flow control equipment, a corona assembly for use with power flow control equipment, and a method for transporting, installing and deploying power flow control equipment are described herein.

One embodiment of a platform for transport, installation, testing and deployment of power flow control equipment includes a wheeled vehicle. Power flow control modules are bolted to a frame and carried by the wheeled vehicle. At least one of the bolted modules is preconfigured for deployment. Standard clamps are used for connecting one or more of the bolted modules in a deployed configuration.

One embodiment of a corona assembly includes a corona ring. The corona ring has conducting tubes. The conducting tubes are arranged in a rectangular shape.

One embodiment of a method is for transporting, installing and deploying power flow control equipment. A wheeled vehicle is provided. Components of the power flow control equipment are preconfigured to provide deployable power flow control subsystems. The power flow control equipment is further configured using bolted attachments to a frame. The wheeled vehicle, with preconfigured components of the power flow control equipment attached to the wheeled vehicle, is transported to an installation site. The power flow control equipment with the bolted attachments is deployed, in deployment mode on the wheeled vehicle. The deploying includes connections to a power transmission line. The power flow control equipment, so deployed on the wheeled vehicle, is operated to inject reactive power into the power transmission line.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A trailer-based system is described for efficiently transporting, configuring and deploying a power flow control system, including attachment to a power transmission line in the field or at a substation. The system includes preconfigured modules using bolted attachments, hoist rings and a corona ring structure. Standardized clamps are also used for labor and time efficiency. A plurality of physically identical impedance injection units (or modules) is operable while mounted on the trailer, wherein each of the units is software configurable to inject a predetermined power control waveform into the power transmission line.

Figure 1:
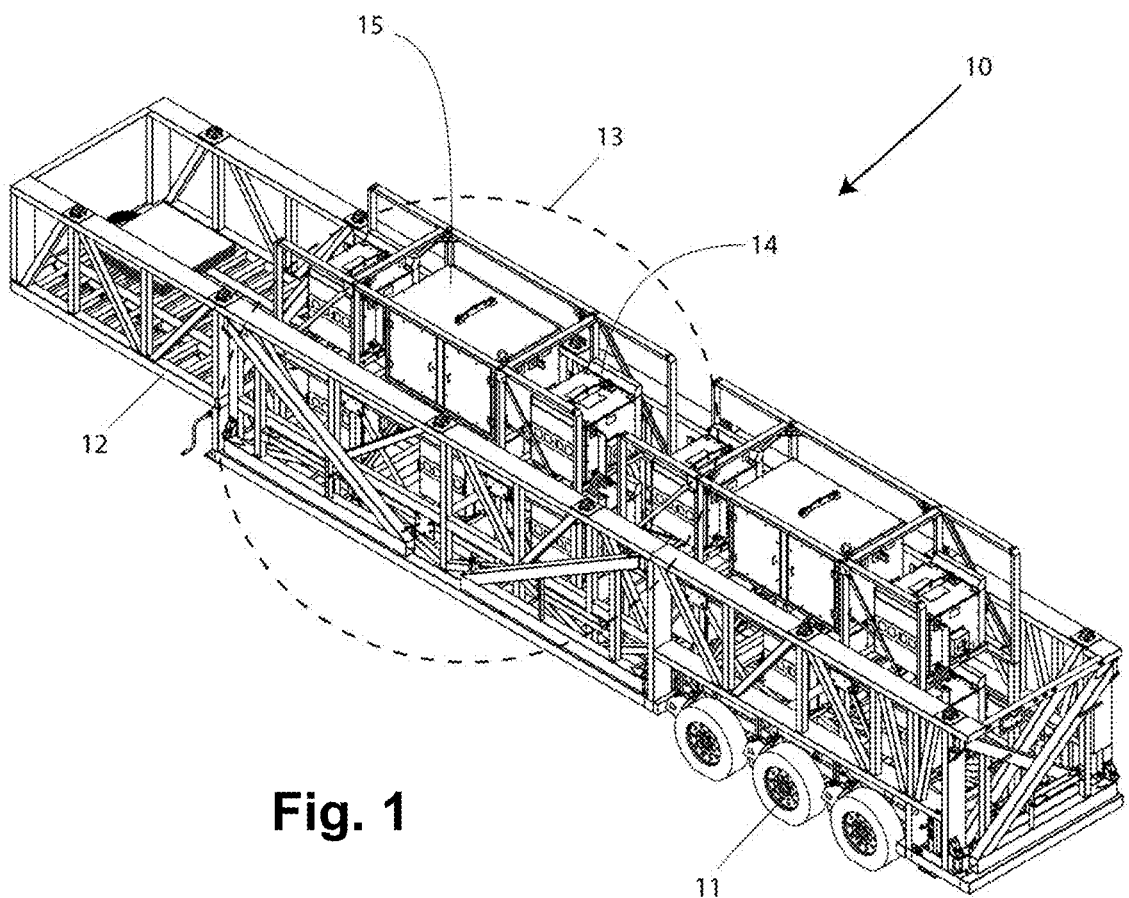
FIG. 1 is a perspective view of a trailer according to one embodiment.

FIG. 1 depicts a wheeled vehicle in the form of a trailer 10 according to one embodiment. Referring to FIG. 1, wheels 11 and a frame 12 are shown. In FIG. 1 a preconfigured power flow control module 13 (which may comprise a rack or racking system) includes five impedance injection units 14 plus a bypass unit 15, although a smaller or greater number of each type of component may be included in the preconfigured module. These units are arranged in the same configuration for transport shown here, and for deployment to be described, leading to reduced overall labor required for transportation, installation, deployment and maintenance. The impedance injection units 14 are used to inject reactive power into a power transmission line. The bypass unit 15 may be used to bypass fault currents that may exceed the normal operating current in the associated power transmission line. Three preconfigured power flow control modules 13 may be carried by trailer 10, comprising 15 impedance injection modules plus 3 bypass modules. However, a greater or smaller number of modules may be carried by trailer 10. Trailer 10 may carry additional equipment such as insulating posts (not shown). Additional trailers may be used to transport the required power flow control equipment to an installation site, depending on the total number of modules or units required.

Figure 2:
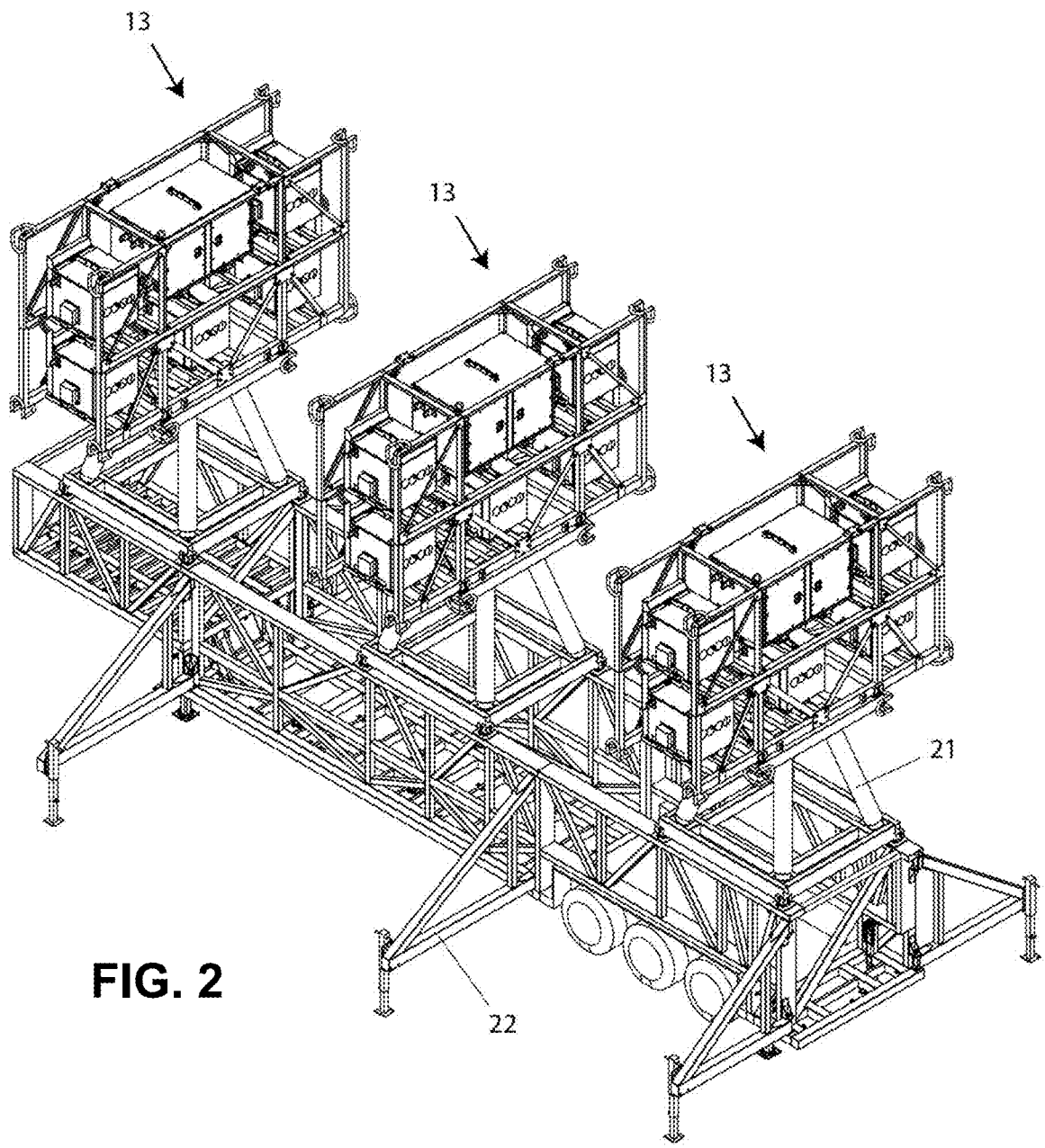
FIG. 2 is a perspective view showing preconfigured modules in deployment mode.

FIG. 2 shows preconfigured power flow control modules 13 mounted on insulating posts 21, prior to connection to a power transmission line. Insulating posts 21 may be fabricated from a ceramic material that is strong in compression and weak in tension. Accordingly, insulating posts 21 in the figure are deployed in a slanted configuration as shown. This provides strength and durability when the slanted configuration is stressed by forces acting in varying directions. An example of a desired strength is resistance to strong horizontal wind gusts. Outriggers 22 are shown, for stabilizing the trailer 10 during deployment. Insulating posts 21 allow the electronic equipment in modules 13 to float near line potential of the power transmission line to which they will be connected. A ground connection to the electronic equipment in modules 13 is not required and is not desirable because the separation distances required for isolation would lead to an increase in size and weight of the installed equipment.

Figure 3:
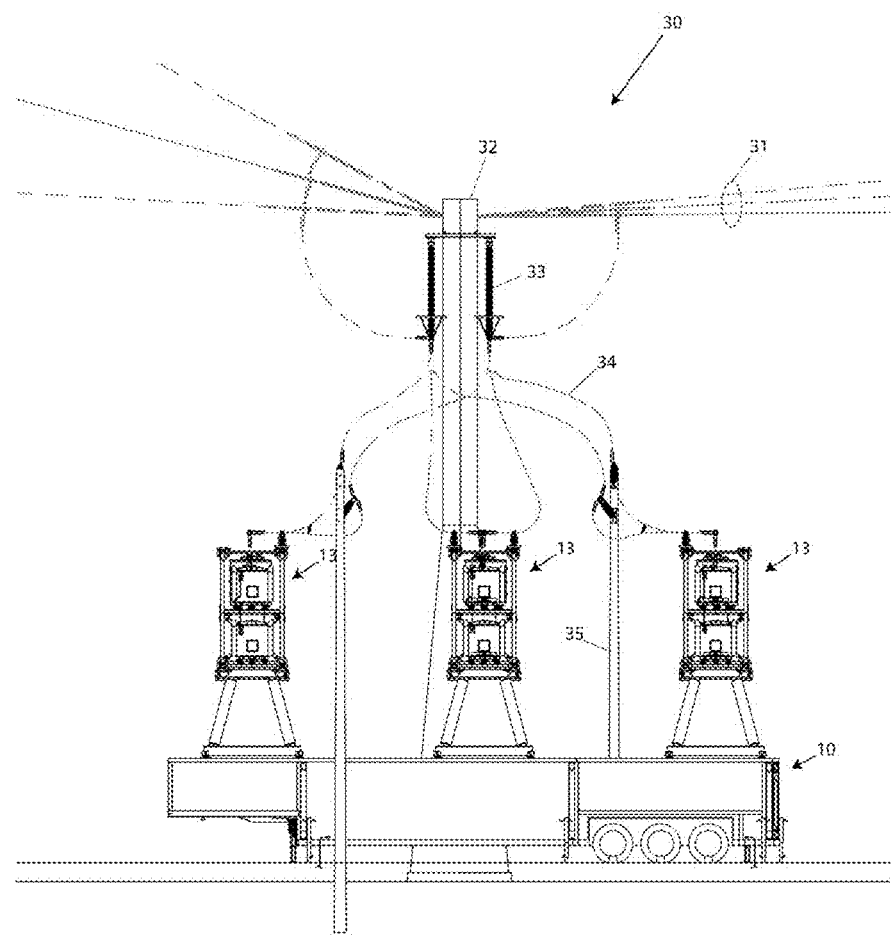
FIG. 3 is a schematic view showing connections of power flow control modules to three phases of a power transmission line, while carried by and operable on a trailer.

FIG. 3 illustrates electrical connections 30 of three preconfigured power flow control modules 13 carried on trailer 10 to three phases 31 of a power transmission line. A transmission line tower 32 is shown, together with surge arrestors 33 and jumpers 34 attached to poles 35. For each phase of the power transmission line, the associated impedance injection units are connected in series. Each preconfigured power flow control module 13 may be operable to perform power flow control of at least 12 mega volt amperes reactive (MVAR) (e.g. 15 MVAR), and the reactive power injected may be either leading or lagging in phase, i.e. either capacitive or inductive power. FIG. 3 shows exemplary electrical connections at a substation site. For safety reasons, the frame on the trailer 10 may be connected to a system ground at the substation. It can be clearly understood that this exemplary system of electrical connections 30 could be adapted to use power flow control units attached to a permanent or semi-permanent ground-based pad instead of to a wheeled vehicle. A further adaptation may be employed if the trailer is located at a transmission line remote from a substation.

Figure 4:
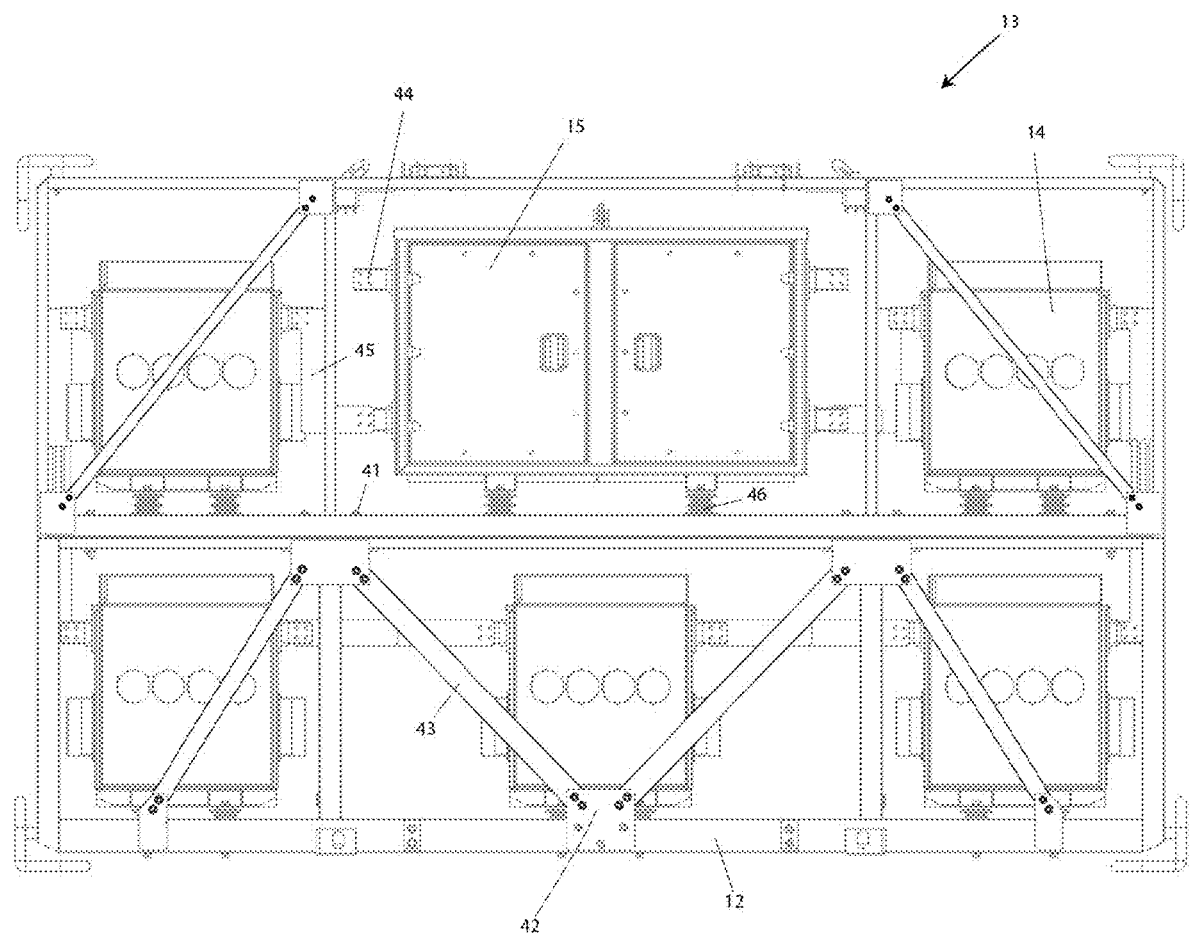
FIG. 4 is a side view of a frame having bolted connections, the frame supporting power flow control modules.

FIG. 4 shows frame 12 having two types of bolted connections. Bolt head 41 indicates the location of a set of bolts that connect the top and the bottom halves of the frame of preconfigured module 13. The halves may be separated for transport, on a flat-bed truck for example. This separation may also be useful to limit the weight of sub-modules of the installed equipment, for ease of handling using a crane plus personnel for example. A second type of bolted connection 42 attaches a bracing arm 43 to frame 12. Bracing arms 43 can be temporarily removed, to access an impedance injection unit using a fork truck for example, perhaps for maintenance. Impedance injection units 14 and a bypass unit 15 are shown. A standard national electrical manufacturers association (NEMA) connector 44 is shown, and a connecting bus bar 45, to be further described in reference to FIG. 8. Insulators 46 are also shown.

Figure 5:
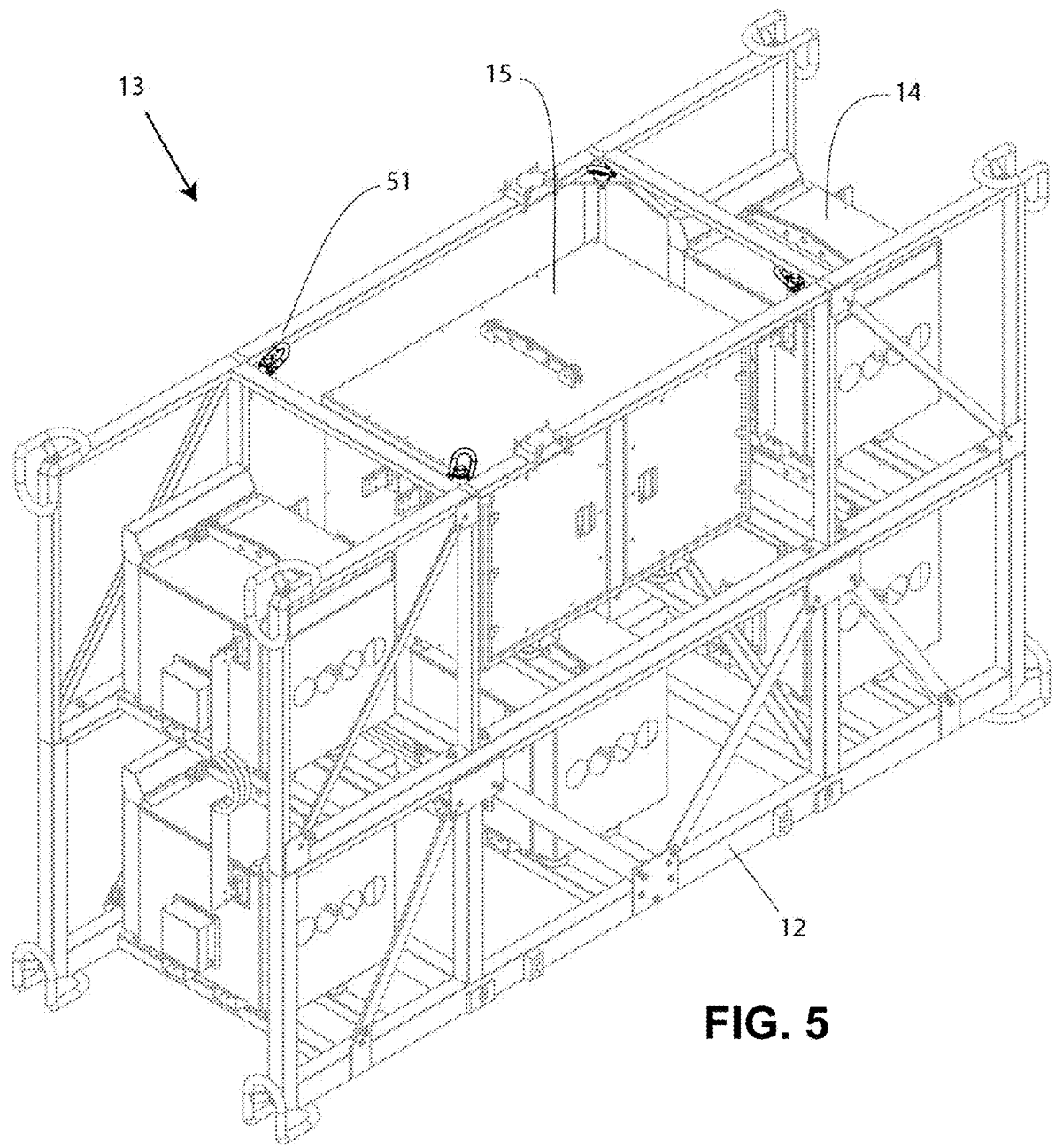
FIG. 5 is a perspective view of a preconfigured power flow control module having hoist rings for use with a crane.

FIG. 5 illustrates the preconfigured power flow control module 13 of FIGS. 1-4, wherein hoist rings 51 are shown. Hoist rings 51 may be used with a crane, for time and labor-efficient assembly of a power flow control installation such as shown in FIG. 3. A similar set of hoist rings may be provided for lifting the lower half of preconfigured module 13. Other lifting tools and attachments may also be used.

Figure 6:
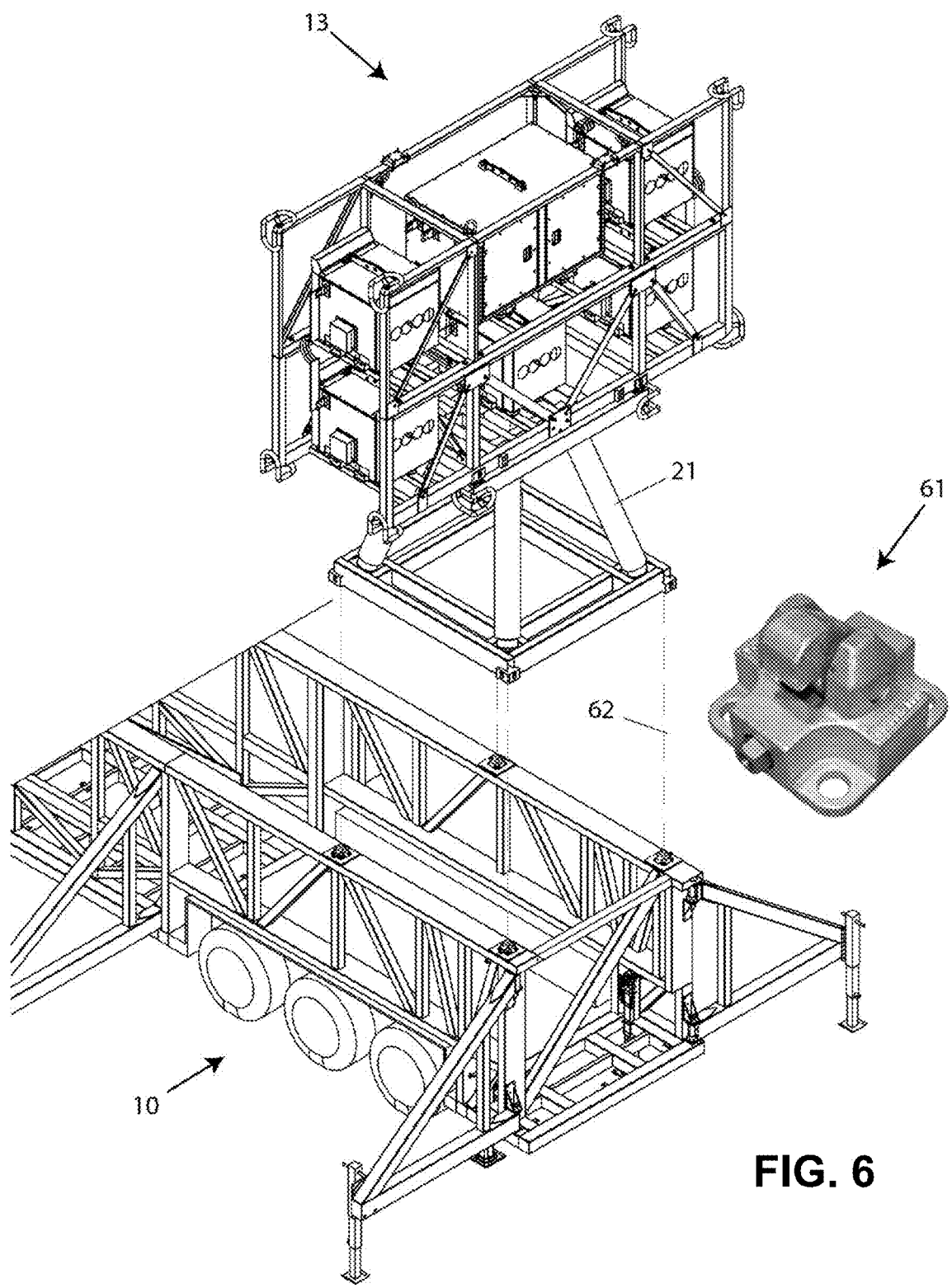
FIG. 6 is a perspective view of a preconfigured power flow control module in deployment mode, wherein attachments of the module to the trailer comprise "quick connect" clamps.

FIG. 6 depicts a clamp 61 (e.g., a VISO clamp) which is a standardized clamp that may be used for interconnecting modules. An example of such a "quick connect" option is the connection 62 between module 13 with insulating posts 21 attached and trailer 10 in the figure. During installation and deployment in the field, the use of clamps 61 leads to fast assembly and dis-assembly as required, requiring fewer labor hours than alternative methods. The clamp 61 may also be referred to as a "vertical clamp connector". One suitable example standardized clamp is the K08A00A vertical clamp connector (VI-SO) from TANDEM LOC, Inc., which fits the ISO-1161 (International Standards Organization) corner fitting large aperture.

Figure 7:
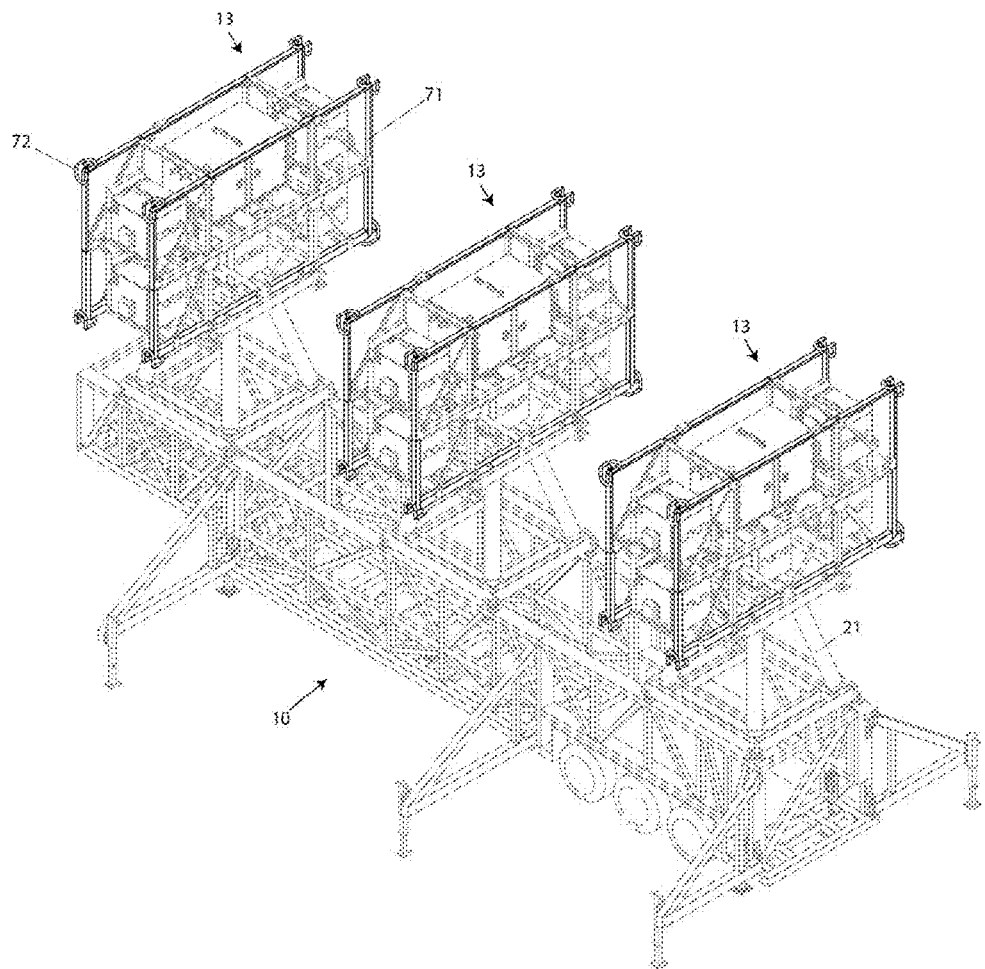
FIG. 7 shows three pre-configured modules in deployment mode comprising 15 impedance injection units and 3 bypass units, with three sets of rectangular shaped corona rings attached.

FIG. 7 shows a deployment of three preconfigured power flow control modules 13 on a trailer 10, wherein each module 13 includes a rectangularly shaped corona ring 71 having rounded corner attachments 72. This configuration of corona ring serves to diminish sparking and arcing around a module 13. This sparking and/or arcing can cause deterioration of the associated components. In addition, sufficient space is provided between modules 13, and between modules 13 and the ground, to prevent arcing between them. Insulating posts 21 contribute to isolation of modules 13 from ground.

Each corona ring 71 may be constructed from a conducting member such as a steel tube. Each rounded corner attachment 72 may be constructed from aluminum. Other conductive materials and constructions may be used.

Figure 8:
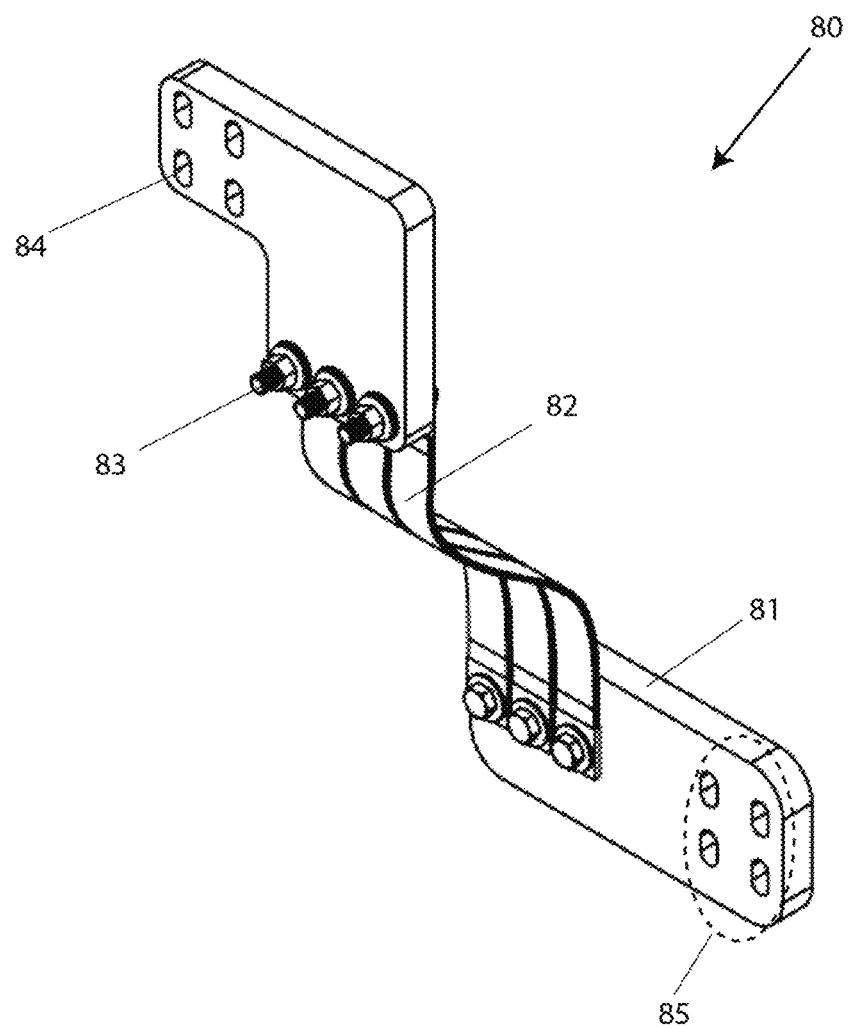
FIG. 8 depicts an exemplary bus bar according to one embodiment.

FIG. 8 depicts an exemplary bus bar 80 according to one embodiment. Bus bar 80 includes a solid section 81, a braided wire section 82, and bolted connections 83. Solid section 81 may comprise a 1-inch thick aluminum plate. The plate thickness may vary by current level. Higher or lower amperage requirements may be implemented by respectively doubling or halving the plate thickness for example. Braided wire section 82 may comprise braided copper wires. It has flexibility to support connection between adjacent modules that may vary slightly in size due to manufacturing tolerances and may also experience expansion/contraction with temperature changes. Slotted holes 84 are also provided to ease alignment and assembly of components to be electrically connected. Hole pattern 85 may be used with a NEMA connector for example.

Figure 9:
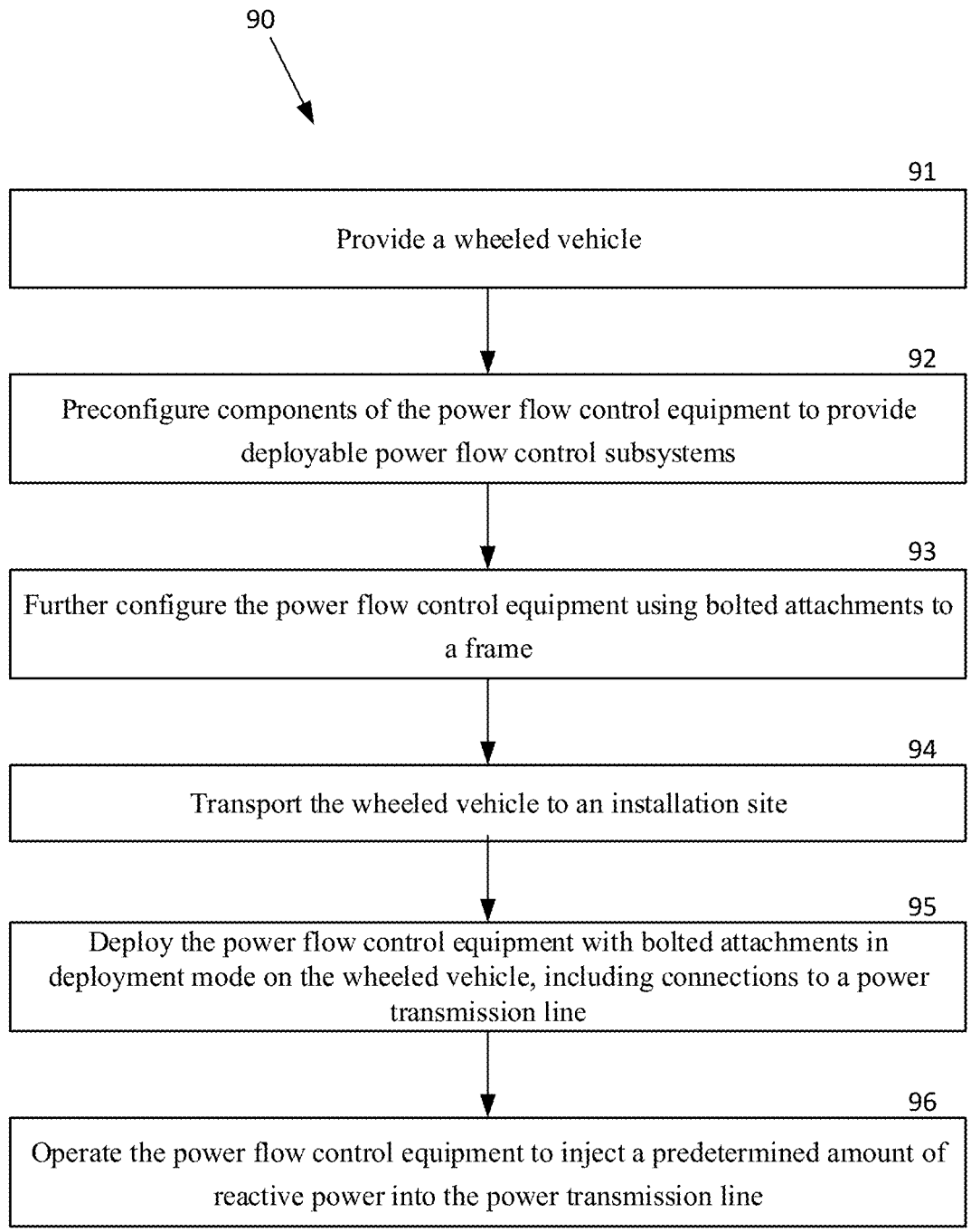
FIG. 9 is a flow chart of an exemplary method for transporting, installing and deploying power flow control equipment according to one embodiment.

FIG. 9 is a flow chart of an exemplary method for transporting, installing and deploying power flow control equipment according to one embodiment. A wheeled vehicle is provided in step 91. In step 92 components of the power flow control equipment are preconfigured to provide deployable power flow control subsystems. Step 93 provides further configuration of the power flow control equipment using bolted attachments to a frame. In step 94 the wheeled vehicle is transported to an installation site. In step 95 the power flow control equipment with bolted attachments is deployed on the wheeled vehicle, including connections to a power transmission line. In the final step 96 the power flow control equipment is operated to inject a predetermined amount of reactive power into the power transmission line.

What is claimed is:

1. A platform for transport and deployment of power flow control equipment, the platform comprising:
   a wheeled vehicle;
   a plurality of power flow control modules, each comprising at least one impedance injection module to inject reactive power into a power line or at least one fault current bypass module to bypass fault currents of the power line, removably connected to a frame and carried by the wheeled vehicle, at least one of the power flow control modules preconfigured for deployment and including insulating posts for isolating the at least one power flow control module from ground in a deployment mode; and
   standardized clamps for connecting one or more of the power flow control modules in a deployed configuration.

2. The platform of claim 1 wherein the wheeled vehicle comprises a trailer.

3. The platform of claim 1 wherein the standardized clamps comprise VISO clamps.

4. The platform of claim 2 wherein the wheeled vehicle includes outriggers for stabilization at an installation site.

5. The platform of claim 1 wherein the power flow control modules further include bus bars having both a solid section and a braided wire section.

6. The platform of claim 1 wherein the platform includes capacity to transport and deploy at least fifteen pre-configured impedance injection modules and at least three pre-configured fault current bypass modules.

7. The platform of claim 1 further comprising one or more of the plurality of power flow control modules having a set of hoist rings for use by a crane.

8. The platform of claim 5 wherein the power flow control modules are configured for attachment to power lines and include corona ring structures.

9. The platform of claim 8 wherein the corona ring structures comprise tubular assemblies having rounded corner attachments.

10. The platform of claim 9 wherein the tubular assemblies have a rectangular shape.

11. The platform of claim 1 wherein the insulation posts enable the at least one power flow control module in the deployment mode to float near line potential of the power line.

12. The platform of claim 1 wherein the plurality of power flow control modules are removably connected to the frame through bolted connections.

\* \* \* \* \*